(12) United States Patent
Lin

(10) Patent No.: US 7,809,063 B2
(45) Date of Patent: Oct. 5, 2010

(54) METHOD AND SYSTEM FOR ADAPTIVE MOTION ESTIMATION

(75) Inventor: Chun-Hung Lin, Jhubei (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 1448 days.

(21) Appl. No.: 11/206,141

(22) Filed: Aug. 18, 2005

(65) Prior Publication Data

US 2006/0188019 A1      Aug. 24, 2006

(30) Foreign Application Priority Data

Feb. 22, 2005     (TW) ............................. 94105288 A

(51) Int. Cl.
*H04N 7/12*     (2006.01)
(52) U.S. Cl. ............. 375/240.16; 375/240; 375/240.01; 375/240.12
(58) Field of Classification Search ................. 375/240, 375/240.01, 240.12, 240.15, 240.16, 240.17
See application file for complete search history.

(56) References Cited

U.S. PATENT DOCUMENTS

| | | | | |
|---|---|---|---|---|
| 5,661,524 A | * | 8/1997 | Murdock et al. | 375/240.15 |
| 2002/0196854 A1 | * | 12/2002 | Kim | 375/240.17 |
| 2004/0190615 A1 | * | 9/2004 | Abe et al. | 375/240.15 |

* cited by examiner

*Primary Examiner*—Allen Wong
(74) *Attorney, Agent, or Firm*—Bacon & Thomas, PLLC

(57) ABSTRACT

A method and system for adaptive motion estimation, which sets a search range in a previous frame in order to find a corresponding macroblock in the adaptive search range according to each macroblock of a current frame and to accordingly determine a corresponding motion vector. A motion vector is first determined by referring to a target macroblock of a current frame and reference macroblocks in a search range of a previous frame. Then, a compression mode is determined according to the target macroblock, the reference macroblocks and the motion vector, and a mode data is outputted corresponding to the compression mode. Finally, a search range is determined according to the mode data and the motion vector. Thus, the required computational amount and bandwidth can be saved and also the high-efficiency image compression is obtained.

20 Claims, 5 Drawing Sheets

METHOD AND SYSTEM FOR ADAPTIVE MOTION ESTIMATION

BACKGROUND OF THE INVENTION

1. Field of the Invention

The invention relates to a method and system for motion estimation and, more particularly, to a method and system for adaptive motion estimation.

2. Description of Related Art

In the international video compression standards such as MPEGx H.26x, the inter-frame prediction that applies block matching to motion estimation is widely used to obtain high efficiency in motion picture data coding. FIG. 1 shows a flowchart of a typical inter-frame coding. As shown in FIG. 1, an MPEG system divides a frame into macroblocks (MBs) or sub-macroblocks wherein a macroblock is a 16×16 pixels block and sub-macroblocks can be 8×8 or 4×4 pixels block. For a previous frame (forward or backward) 11 and a current frame 12, when coding, a corresponding motion vector is found for each block 101' of the previous frame 11 at first. Accordingly, motion estimation of the previous frame 11 can obtain a prediction frame 13. A difference frame 14 is obtained by comparing the prediction frame 13 and the current frame 12. As such, only the motion vectors and the difference frame 14 are required in transmission or storage, and effective compression is obtained. For decompression, the motion vectors and the difference frame 14 are sent to an MPEG decoder, and original blocks of the current frame 12 are restored by adding corresponding blocks read from the previous frame 11 based on the motion vectors and blocks of the difference frame 14.

As shown in FIG. 2, the motion estimation is based on each block 101 of the current frame 12 to find a corresponding block 101' from the previous frame 11 within a search area 111, thereby obtaining the motion behavior of the block 101' and thus determining a corresponding motion vector. Because the motion estimation requires performing block matching, it occupies a large proportion of the computation and the usable bandwidth in video compression, and the proportion occupied is essentially determined by a search range 111 to be set. If the search range 111 is too large, it causes a waste of computation so as to have poor compression efficiency. Conversely, when the search range 111 is too small, the desired block may not be found to cause a reduction of compression rate. Thus, it is an important subject to determine an appropriate search range 111.

Accordingly, FIG. 3 shows a typical method in which a previous motion vector determined by performing a previous motion estimation on an input target block 101 and the blocks 101' within the search range 111 is temporarily stored in a motion vector memory 31. Thus, when a current motion estimation is performed on the input target block 101 and the blocks 101' within the search range 111, a search range 1~N is selected according to the previous motion vector stored in the motion vector memory 31. Such a method adjusts the search range only using the previous motion vector, and when a complicated video such as a scene change or a shaded background of a previous frame presents, it cannot provide an effective prediction of search range due to a large difference between the previous frame and a current frame. In addition, only the motion vector is used to adjust the search range, which easily causes the unstable search range adjustment due to the inaccurate motion estimation and further leads to the unstable compression frame quality. Therefore, it is desirable to provide an improved method and system for adaptive motion estimation to mitigate and/or obviate the aforementioned problems.

SUMMARY OF THE INVENTION

The object of the invention is to provide a method and system for adaptive motion estimation, which can save the required computation (i.e., save power consumption) and bandwidth and also obtain the high-efficiency image compression.

In accordance with one aspect of the invention, a system for adaptive motion estimation is provided, which sets a search range in a previous frame in order to find a corresponding block in the search range according to each block of a current frame and to accordingly determine a corresponding motion vector. The system includes: a motion estimation unit, a mode decision unit, a mode memory unit, a motion vector memory unit and a search range specifying unit. The motion estimation unit determines a motion vector by referring to a target block of a current frame and reference blocks in a search range of a previous frame. The mode decision unit determines a compression mode according to the target block, the reference blocks and the motion vector and outputs a mode data corresponding to the compression mode. The mode memory unit stores the mode data output by the mode decision unit. The motion vector memory unit stores the motion vector determined by the motion estimation unit. The search range specifying unit determines a search range according to the mode data stored in the mode memory unit and the motion vector stored in the motion vector memory unit.

In accordance with another aspect of the invention, a method for adaptive motion estimation is provided, which sets a search range in a previous frame in order to find a corresponding block in the search range according to each block of a current frame and to accordingly determine a corresponding motion vector. The method includes: (A) determining a motion vector by referring to a target block of a current frame and reference blocks in a search range of a previous frame; (B) determining a compression mode according to the target block, the reference blocks and the motion vector, and outputting a mode data corresponding to the compression mode; (C) storing the mode data outputted by step (B); (D) storing the motion vector determined by step (A); and (E) determining a search range according to the mode data stored and the motion vector stored.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
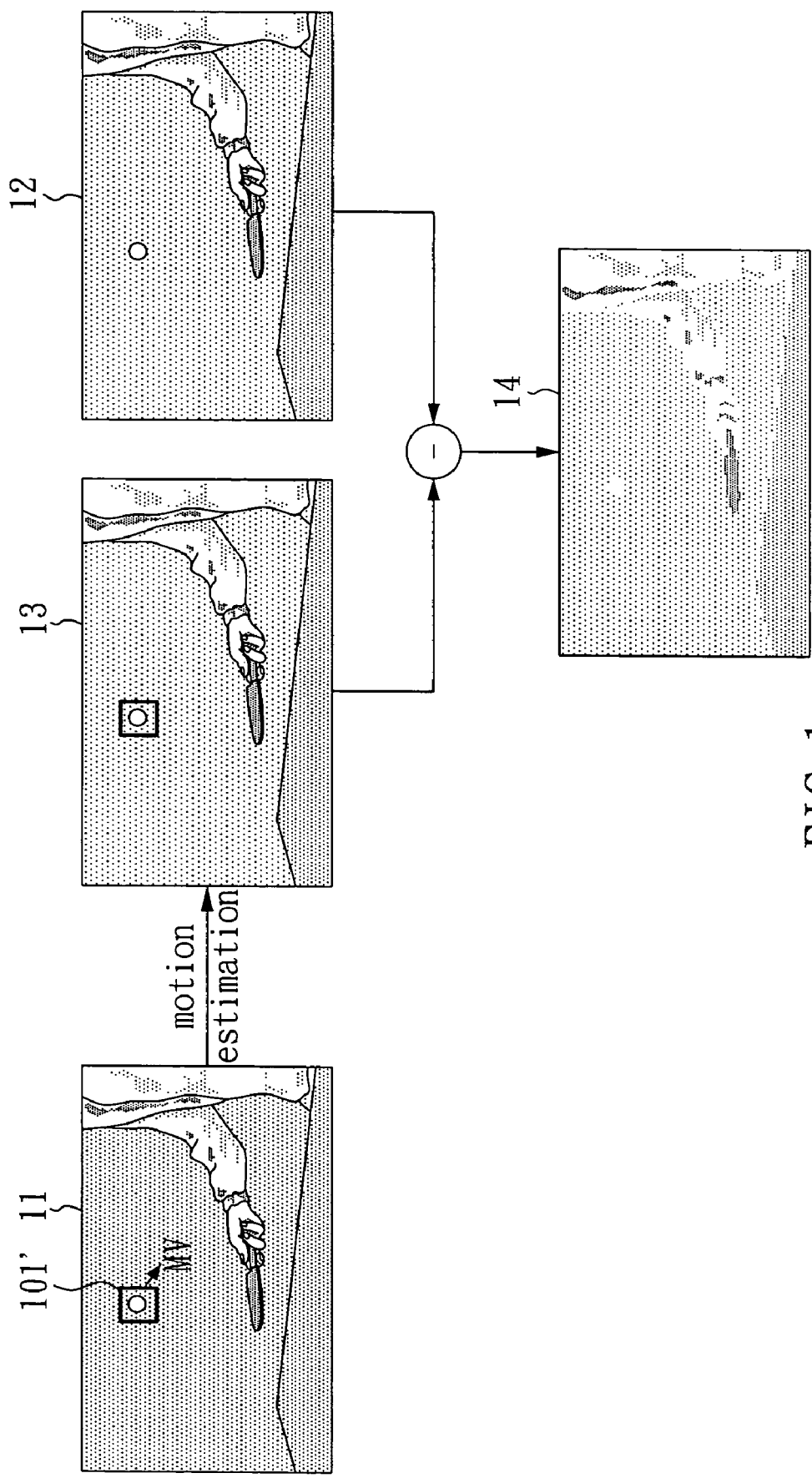
FIG. 1 shows a flowchart of a typical inter-frame coding.
Figure 2:
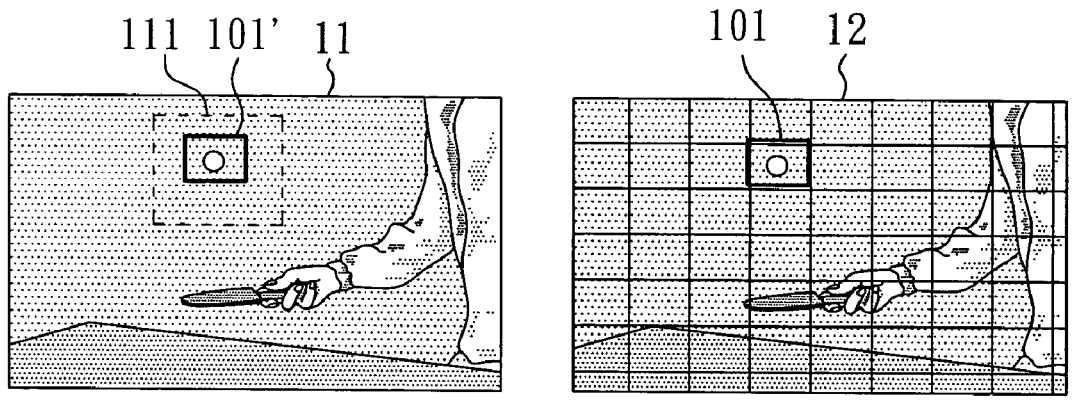
FIG. 2 shows a flowchart of a typical motion estimation.
Figure 3:
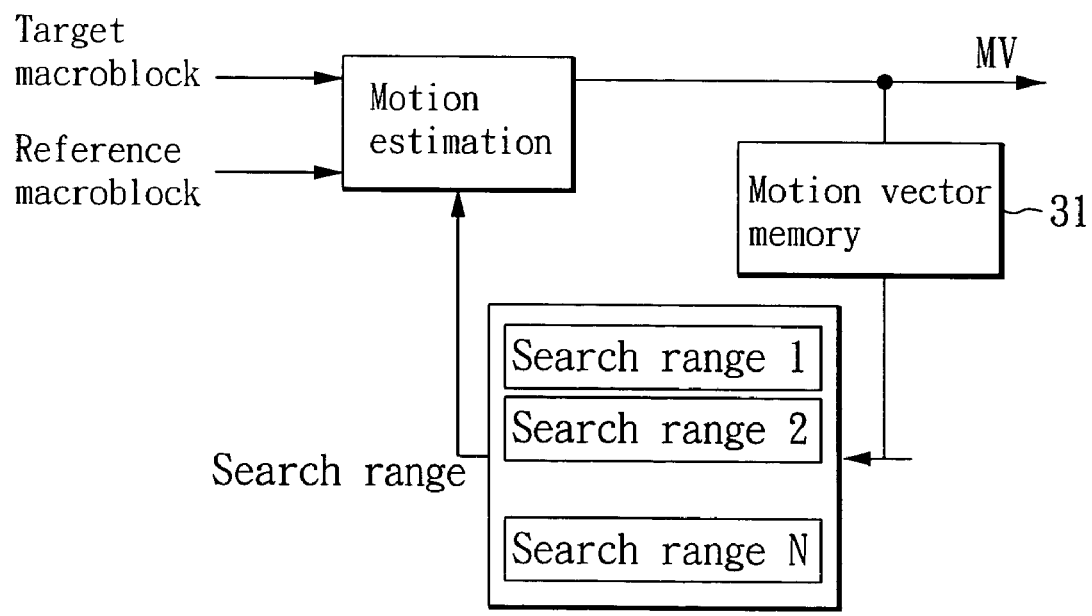
FIG. 3 shows a schematic diagram of a search range specifying of a typical motion estimation.
Figure 4:
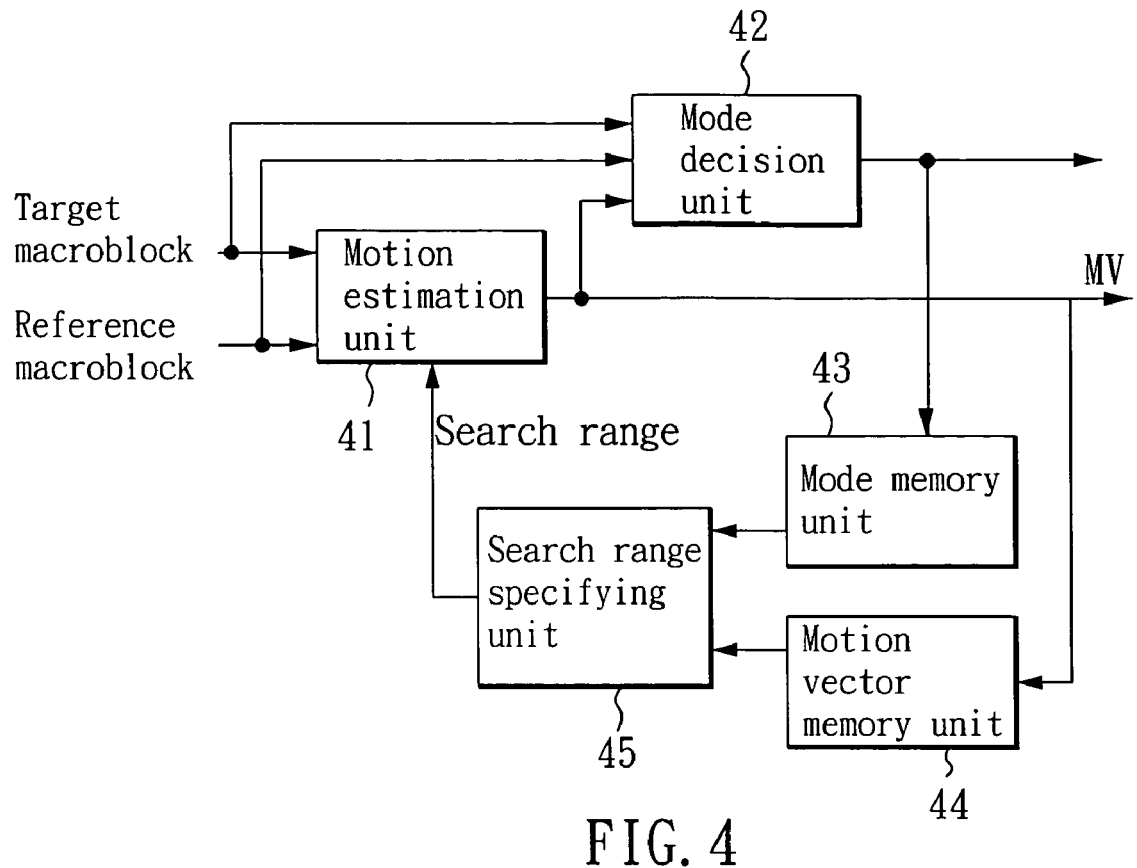
FIG. 4 shows a diagram of a system for adaptive motion estimation according to the invention.
Figure 5:
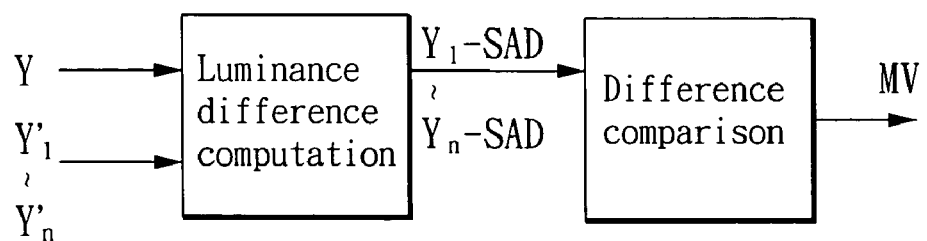
FIG. 5 shows a schematic diagram of a motion estimation performed by a motion estimation unit according to the invention.

FIG. 4 shows a diagram of a system for adaptive motion estimation according to the invention. As shown in FIG. 4, the system includes a motion estimation unit 41, a mode decision unit 42, a mode memory unit 43, a motion vector memory unit 44 and a search range specifying unit 45. The motion estimation unit 41 determines a motion vector MV by referring to a target block of a current frame and reference blocks in a search range of a previous frame, as shown in FIG. 5. The motion estimation unit 41 first computes luminance differences $Y_1$-SAD to $Y_n$-SAD between the luminance Y of a target block and the luminance $Y_1'\sim Y_n'$ of candidate blocks within a search range corresponding to the target block. The difference computation can use a known summed absolute difference (SAD). The luminance differences $Y_1$-SAD~$Y_n$-SAD are compared with each other to find a minimum one for accordingly finding a motion vector MV of the target block. When the motion vector MV is determined, the mode decision unit 42 determines a compression mode according to the target block, the reference blocks and the motion vector MV, and outputs a mode data corresponding to the compression mode. The compression mode can be: intra, zero cbp, skipped, direct mode, SAD, intra variance or MB bit. The mode memory unit 43 stores the mode data output by the mode decision unit 42. The motion vector memory unit 44 stores the motion vector MV determined by the motion estimation unit 41.

Figure 6:
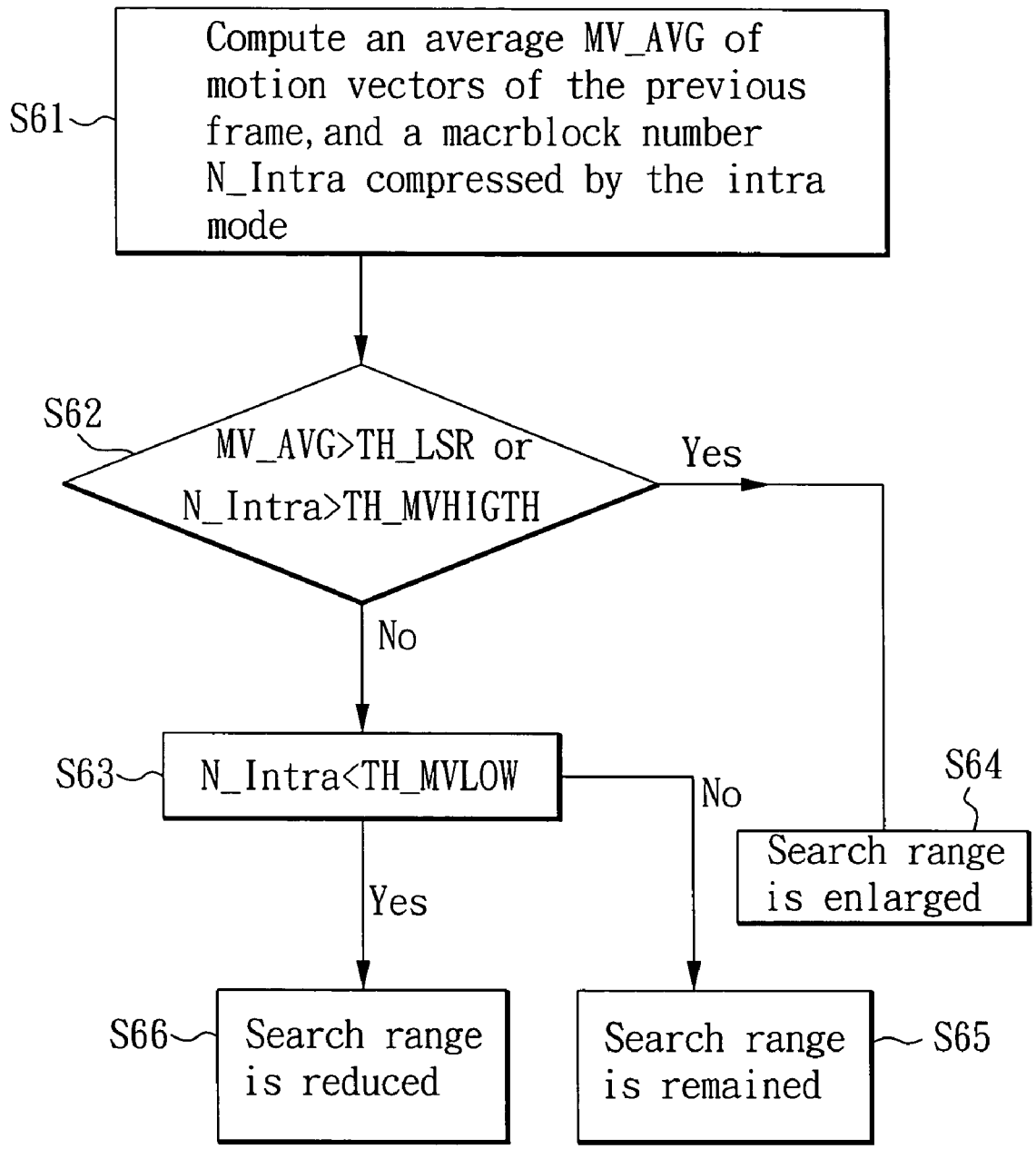
FIG. 6 shows a flowchart of an operation of a search range specifying unit according to the invention.

The search range specifying unit 45 determines the adaptive search range according to the mode data stored in the mode memory unit 43 and the motion vector MV stored in the motion vector memory unit 44. FIG. 6 shows a flowchart of an operation of the search range specifying unit 45. As shown in FIG. 6, step S61 computes an average MV_AVG of motion vectors of the previous frame according to the motion vector MV stored in the motion vector memory unit 44, and a block number N_Intra compressed by the intra mode corresponding to the mode data stored in the mode memory unit 43. The average MV_AVG corresponds to a displacement of video data while blocks compressed by the intra mode corresponds to blocks not found in the search range and thus regarded as internal data in compression. When the average MV_AVG is greater than a search range threshold TH_LSR or the block number N_Intra compressed by the intra mode is greater than a high motion vector threshold TH_MVHIGH (step S62), it indicates that the displacement of the video data is large or the search range is too small so as not to find a corresponding block, thus the search range is enlarged (step S64). When the average MV_AVG is not greater than a search range threshold TH_LSR and the block number N_Intra compressed by the intra mode is smaller than a low motion vector threshold TH_MVLOW (step S63), it indicates that the displacement of the video data is small and the search range is too large, thus the search range is reduced (step S66). Otherwise, the search range is remained (step S65). As such, the search range specifying unit 45 can determine an adaptive search range according to the substantial compression for the motion estimation unit 41 to perform motion estimation.

Figure 7:
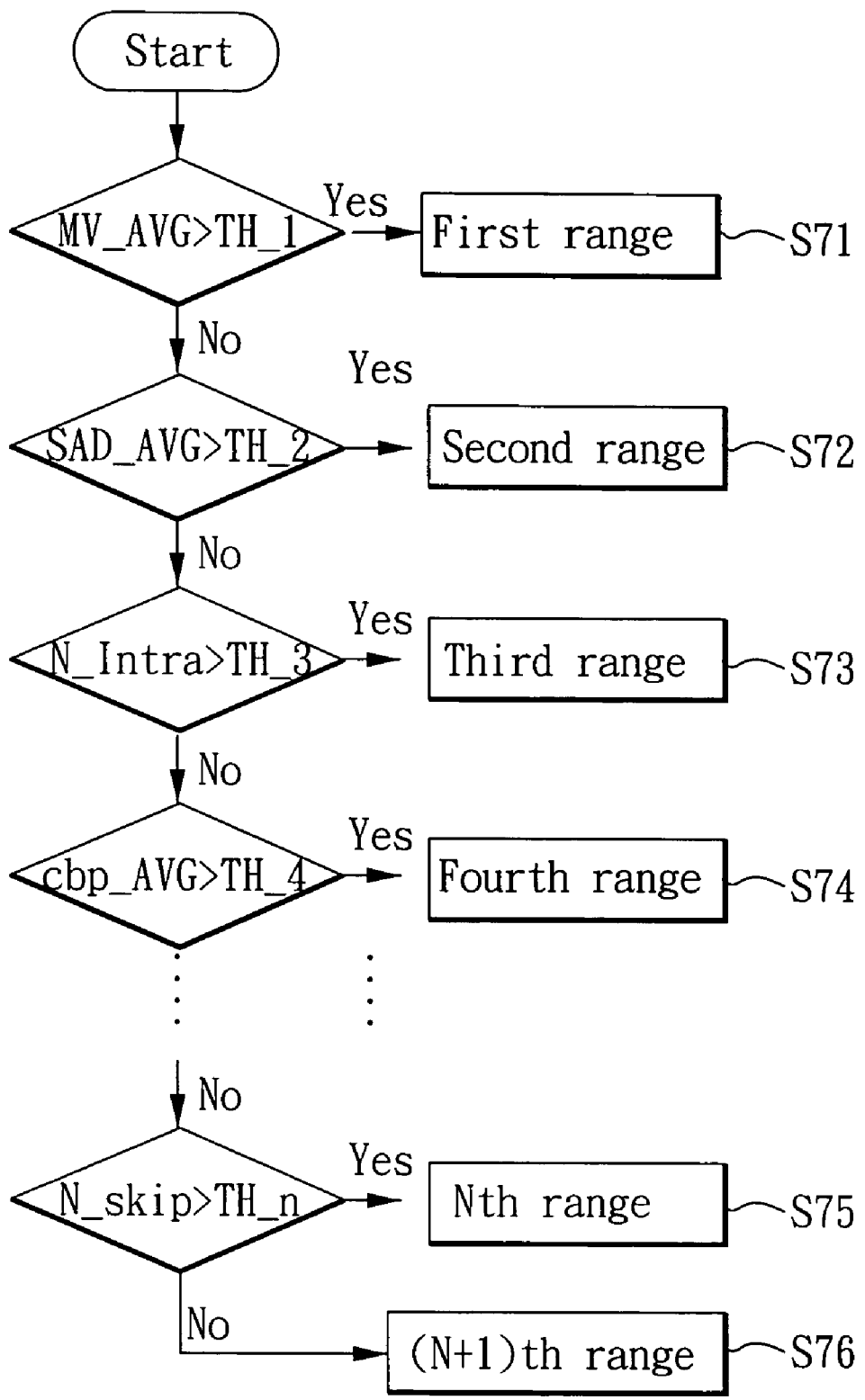
FIG. 7 shows a flowchart of another operation of a search range specifying unit according to the invention.

FIG. 7 shows a flowchart of another operation of the search range specifying unit 45, which determines an adaptive search range sequentially based on the motion vectors of a previous frame and the used compression modes. As shown in FIG. 7, step S71 computes an average MV_AVG of the motion vectors of the previous frame according to the motion vector MV stored in the motion vector memory unit 44, and determines the search range as a predetermined first range when the average MV_AVG is greater than a first threshold TH_1. When the average MV_AVG is not greater than a first threshold TH_1, step S72 computes an averaged difference SAD_AVG of the motion vectors of the previous frame according to the motion vector MV stored in the motion vector memory unit 44, and determines the search range as a predetermined second range when the averaged difference SAD_AVG is greater than a second threshold TH_2. When the averaged difference SAD_AVG is not greater than the second threshold TH_2, step S73 computes a block number N_Intra compressed by the intra mode corresponding to the mode data stored in the mode memory unit 43, and determines the search range as a predetermined third range when the block number N_Intra is greater than a third threshold TH_3. When the block number N_Intra is not greater than the third threshold TH_3, step S74 computes a cbp average of blocks compressed by the zero cbp mode corresponding to the mode data stored in the mode memory unit 43, and determines the search range as a predetermined fourth range when the cbp average is greater than a fourth threshold TH_4. When the cbp average is not greater than the fourth threshold TH_4, step S75 computes a block number N_Skip compressed by the skipped mode corresponding to the mode data stored in the mode memory unit 43, and determines the search range as a predetermined Nth range when the block number N_Skip is greater than an Nth threshold TH_N, and otherwise step S76 determines the search range as a predetermined (N+1)th range, wherein the first range>the second range>the third range> . . . >the Nth range>the (N+1)th range.

As cited, the invention uses a simple and effective determination process to directly adjust a motion search range with a size of the entire frame, which determines a motion search range of a current image scene according to an average of motion vectors of a previous predictive coded picture and an internal block number of the picture or compression modes of a previous frame. Thus, high-efficiency image compression is obtained as well as the computational amount (power consumption) and used bandwidth are saved.

Although the present invention has been explained in relation to its preferred embodiment, it is to be understood that many other possible modifications and variations can be made without departing from the spirit and scope of the invention as hereinafter claimed.

What is claimed is:

1. A system for adaptive motion estimation, which sets a search range in a previous frame in order to find a corresponding block in the adaptive search range according to each block of a current frame and to accordingly determine a corresponding motion vector, the system comprising:

a motion estimation unit, which determines a motion vector by referring to a target block of the current frame and reference blocks in the search range of the previous frame;

a mode decision unit, which determines a compression mode according to the target block, the reference blocks and the motion vector and outputs a mode data corresponding to the compression mode;

a mode memory unit, which stores the mode data output by the mode decision unit;

a motion vector memory unit, which stores the motion vector determined by the motion estimation unit; and a search range specifying unit, which determines the search range according to the mode data stored in the mode memory unit and the motion vector stored in the motion vector memory unit, wherein the search range specifying unit computes an average of motion vectors of the previous frame according to the motion vector stored in the motion vector memory unit and a block number compressed by an intra mode corresponding to the mode data stored in the mode memory unit, and enlarges the search range when the average is greater than a predetermined search range threshold or the block number compressed by the intra mode is greater than predetermined a high motion vector threshold.

2. The system as claimed in claim 1, wherein the search range specifying unit reduces the search range when the average is not greater than the search range threshold and the block number compressed by the intra mode is smaller than a predetermined low motion vector threshold.

3. The system as claimed in claim 1, wherein the blocks of current frame and previous frame are macroblocks.

4. The system as claimed in claim 1, wherein the blocks of current frame and previous frame are subblocks of macroblocks.

5. A method for adaptive motion estimation, which sets a search range in a previous frame in order to find a corresponding block in the search range according to each block of a current frame and to accordingly determine a corresponding motion vector, the method comprising the steps:
(A) determining a motion vector by referring to a target block of the current frame and reference blocks in the search range of the previous frame;
(B) determining a compression mode according to the target block, the reference blocks and the motion vector, and outputting a mode data corresponding to the compression mode;
(C) storing the mode data outputted by step (B);
(D) storing the motion vector determined by step (A); and
(E) determining the search range according to the mode data stored and the motion vector stored,
wherein step (E) computes an average of motion vectors of the previous frame according to the motion vector stored and a block number compressed by an intra mode corresponding to the mode data stored, and enlarges the search range when the average is greater than a predetermined search range threshold or the block number compressed by the intra mode is greater than a predetermined high motion vector threshold.

6. The method as claimed in claim 5, wherein step (E) reduces the search range when the average is not greater than the predetermined search range threshold and the block number compressed by the intra mode is smaller than a predetermined low motion vector threshold.

7. The method as claimed in claim 5, wherein the blocks of current frame and previous frame are macroblocks.

8. The method as claimed in claim 5, wherein the blocks of current frame and previous frame are subblocks of macroblocks.

9. A system for adaptive motion estimation, which sets a search range in a previous frame in order to find a corresponding block in the adaptive search range according to each block of a current frame and to accordingly determine a corresponding motion vector, the system comprising:
a motion estimation unit, which determines a motion vector by referring to a target block of the current frame and reference blocks in the search range of the previous frame;
a mode decision unit, which determines a compression mode according to the target block, the reference blocks and the motion vector and outputs a mode data corresponding to the compression mode;
a mode memory unit, which stores the mode data output by the mode decision unit;
a motion vector memory unit, which stores the motion vector determined by the motion estimation unit; and
a search range specifying unit, which determines the search range according to the mode data stored in the mode memory unit and the motion vector stored in the motion vector memory unit,
wherein the search range specifying unit computes an average of motion vectors of the previous frame according to the motion vector stored in the motion vector memory unit, and sets the search range as a predetermined first range when the average is greater than a predetermined first threshold, and wherein when the average is not greater than the predetermined first threshold, the search range specifying unit computes an averaged difference of the motion vectors of the previous frame according to the motion vector stored in the motion vector memory unit, and sets the search range as a predetermined second range when the averaged difference is greater than a predetermined second threshold, where the first range is greater than the second range.

10. The system as claimed in claim 9, wherein when the averaged difference is not greater than the predetermined second threshold, the search range specifying unit computes a block number compressed by an intra mode corresponding to the mode data stored in the mode memory unit, and sets the search range as a predetermined third range when the block number compressed by the intra mode is greater than a predetermined third threshold, where the second range is greater than the third range.

11. The system as claimed in claim 10, wherein when the block number compressed by the intra mode is not greater than the predetermined third threshold, the search range specifying unit computes a cbp average of blocks compressed by a zero cbp mode corresponding to the mode data stored in the mode memory unit, and sets the search range as a fourth range when the cbp average compressed by the zero cbp mode is greater than a predetermined fourth threshold, where the third range is greater than the fourth range.

12. The system as claimed in claim 10, wherein when the cbp average compressed by the zero cbp mode is not greater than the predetermined fourth threshold, the search range specifying unit computes a block number compressed by a skipped mode corresponding to the mode data stored in the mode memory unit, and sets the search range as a fifth range when the block number compressed by the skipped mode is greater than a predetermined sixth threshold, where the fifth range is greater than the sixth range.

13. The system as claimed in claim 9, wherein the blocks of current frame and previous frame are macroblocks.

14. The system as claimed in claim 9, wherein the blocks of current frame and previous frame are subblocks of macroblocks.

15. A method for adaptive motion estimation, which sets a search range in a previous frame in order to find a corresponding block in the search range according to each block of a current frame and to accordingly determine a corresponding motion vector, the method comprising the steps:
(A) determining a motion vector by referring to a target block of the current frame and reference blocks in the search range of the previous frame;
(B) determining a compression mode according to the target block, the reference blocks and the motion vector, and outputting a mode data corresponding to the compression mode;
(C) storing the mode data outputted by step (B);
(D) storing the motion vector determined by step (A); and (E) determining the search range according to the mode data stored and the motion vector stored, wherein step (E) computes an average of motion vectors of the previous frame according to the motion vector stored, and sets the search range as a predetermined first range when the average is greater than a predetermined first threshold, and wherein when the average is not greater than the predetermined first threshold, step (E) computes an averaged difference of the motion vectors of the previous frame according to the motion vector, and sets the search range as a predetermined second range when the averaged difference is greater than a predetermined second threshold, where the first range is greater than the second range.

16. The method as claimed in claim 15, wherein when the averaged difference is not greater than the predetermined second threshold, step (E) computes a block number compressed by an intra mode corresponding to the mode data, and sets the search range as a third range when the block number compressed by the intra mode is greater than a predetermined third threshold, where the second range is greater than the third range.

17. The method as claimed in claim 16, wherein when the block number compressed by the intra mode is not greater than the predetermined third threshold, step (E) computes a cbp average of blocks compressed by a zero cbp mode corresponding to the mode data, and sets the search range as a fourth range when the cbp average compressed by the zero cbp mode is greater than a predetermined fourth threshold, where the third range is greater than the fourth range.

18. The method as claimed in claim 17, wherein when the cbp average compressed by the zero cbp mode is not greater than the predetermined fourth threshold, step (E) computes a block number compressed by a skipped mode corresponding to the mode data, and sets the search range as a predetermined fifth range when the block number compressed by the skipped mode is greater than a predetermined fifth threshold, otherwise sets the search range as a predetermined sixth range, where the fourth range is greater than the fifth range and the fifth range is greater than the sixth range.

19. The method as claimed in claim 15, wherein the blocks of current frame and previous frame are macroblocks.

20. The system as claimed in claim 15, wherein the blocks of current frame and previous frame are subblocks of macroblocks.

* * * * *